(12) United States Patent
Kizawa

(10) Patent No.: US 7,133,146 B2
(45) Date of Patent: Nov. 7, 2006

(54) PRINTING APPARATUS, SERVER APPARATUS AND INFORMATION PROCESSING APPARATUS

(75) Inventor: Makoto Kizawa, Ueda (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 1216 days.

(21) Appl. No.: 09/738,774

(22) Filed: Dec. 18, 2000

(65) Prior Publication Data

US 2001/0019421 A1    Sep. 6, 2001

(30) Foreign Application Priority Data

Mar. 3, 2000    (JP) .............................. 2000-058779

(51) Int. Cl.
*G06F 3/12*    (2006.01)
*G06K 15/00*    (2006.01)

(52) U.S. Cl. ..................................... 358/1.15; 358/1.14

(58) Field of Classification Search ........ 358/1.1–1.18; 440/582, 605, 68, 624; 271/9.05, 9.01–9.04; 399/81, 82, 382; 710/1–8
See application file for complete search history.

(56) References Cited

U.S. PATENT DOCUMENTS

| | | | |
|---|---|---|---|
| 6,570,667 B1 * | 5/2003 | Hattori et al. ............. | 358/1.15 |
| 2005/0084314 A1 * | 4/2005 | Anderson et al. | |

FOREIGN PATENT DOCUMENTS

| | | |
|---|---|---|
| JP | 8-286854 | 11/1996 |
| JP | 9-185472 | 7/1997 |
| JP | 10-235973 | 9/1998 |
| JP | 10-303931 | 11/1998 |
| JP | 11-352842 | 12/1999 |
| JP | 2000-66862 | 3/2000 |
| JP | 2001-100468 | 4/2001 |
| JP | 2001-180081 | 7/2001 |

OTHER PUBLICATIONS

English Language Abstract of JP 10-235973.
English Language Abstract of JP 9-185472.
English Language Abstract of JP 2000-66862.
English Language Abstract of JP 11-352842.
English Language Abstract of JP 10-303931.
English Language Abstract of JP 8-286854.
English Language Abstract of JP 2001-100468.
English Language Abstract of JP 2001-180081.

* cited by examiner

*Primary Examiner*—Douglas Q. Tran
(74) *Attorney, Agent, or Firm*—Greenblum & Bernstein, P.L.C.

(57) ABSTRACT

Recording sheet-type information employed in a special use is set beforehand in a printing apparatus. An information processing apparatus connected the printing apparatus through predetermined communication media inquires of the recording sheet-type information set in the printing apparatus. Since the recording sheet-type information is informed from the printing apparatus, the information processing apparatus indicates the recording sheet-type information informed from the printing apparatus.

15 Claims, 9 Drawing Sheets

(RECORDING SHEET-TYPE INDICATION SCREEN)

| TRAY NUMBER | RECORDING SHEET-TYPE | RECORDING SHEET SIZE | REMAINING NUMBER OF RECORDING SHEET |
|---|---|---|---|
| PAPER FEED TRAY 1 | ORDINARY SHEET | A4 | RECORDING SHEET EXIST |
| PAPER FEED TRAY 2 | BACK-PRINTED SHEET | A4 | NO RECORDING SHEET |
| PAPER FEED TRAY 3 | ORDINARY SHEET | B4 | NO RECORDING SHEET |
| PAPER FEED TRAY 4 | OHP SHEET | B4 | RECORDING SHEET EXIST |

ANOTHER PRINTER    COMPLETION

PRINTING APPARATUS, SERVER APPARATUS AND INFORMATION PROCESSING APPARATUS

BACKGROUND OF THE INVENTION

1. Field of the Invention

The present invention relates to a printing apparatus, a server apparatus and an information processing apparatus connected mutually through predetermined communication media.

2. Description of the Related Art

Conventionally, when printing is performed by a printing apparatus connected to a network, generally, the printing apparatus performs printing while receiving instruction from a personal computer (hereinafter, referred to as only PC). On this occasion, the printing apparatus detects recording sheets stored in paper feed cassette within the printing apparatus. The printing apparatus transmits status information such as sizes of detected recording sheets and/or existence of the recording sheets and so forth to the PC. The PC receives the status information, followed by indicating the status information on a display. Then, an operator of the PC can perform printing to a required recording sheet while selecting the targeted paper feed cassette.

However, in the conventional printing apparatus, there is a problem that although the printing apparatus is capable of detecting about sizes of recording sheets and/or existence of the recording sheets and so forth stored in paper feed cassette, it is impossible to detect about kinds of the recording sheets and so forth.

For instance, when a recording sheet whose back is performed printing processing (hereinafter referred to as "back printed sheet") or a recording sheet which is employed for a special use such as OHP sheet and so forth already stored in the paper feed cassette, the conventional printing apparatus can not detect the kinds of the recording sheets. For that reason, when an operator of the PC desires to print while employing special recording sheets, uncertain method is taken that the operator should select a paper feed cassette due to remembrance of the operator.

SUMMARY OF THE INVENTION

An object of the present invention is to provide a printing apparatus, a server apparatus and an information processing apparatus, which are capable of selecting surely a printing apparatus in which required special recording sheets are stored in, thus which apparatus are excellent in convenience.

In the present invention, a printing apparatus connected through predetermined communication media sets beforehand recording sheet-type information employed for a special use in the printing apparatus. Further, an information processing apparatus connected through the predetermined communication media inquires the recording sheet-type information set in the printing apparatus to the printing apparatus. Then, the information processing apparatus indicates the recording sheet-type information informed from the printing apparatus. Thus, since the form-type information is informed from the printing apparatus, the information processing apparatus is capable of ascertaining the printing apparatus in which the recording sheets employed in a special use is stored in. According to the operation, it is possible to select surely the printing apparatus in which required special recording sheets is stored in.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

Hereinafter, one embodiment of the present invention will be described in detail referring to the accompanying drawings.

Figure 1:
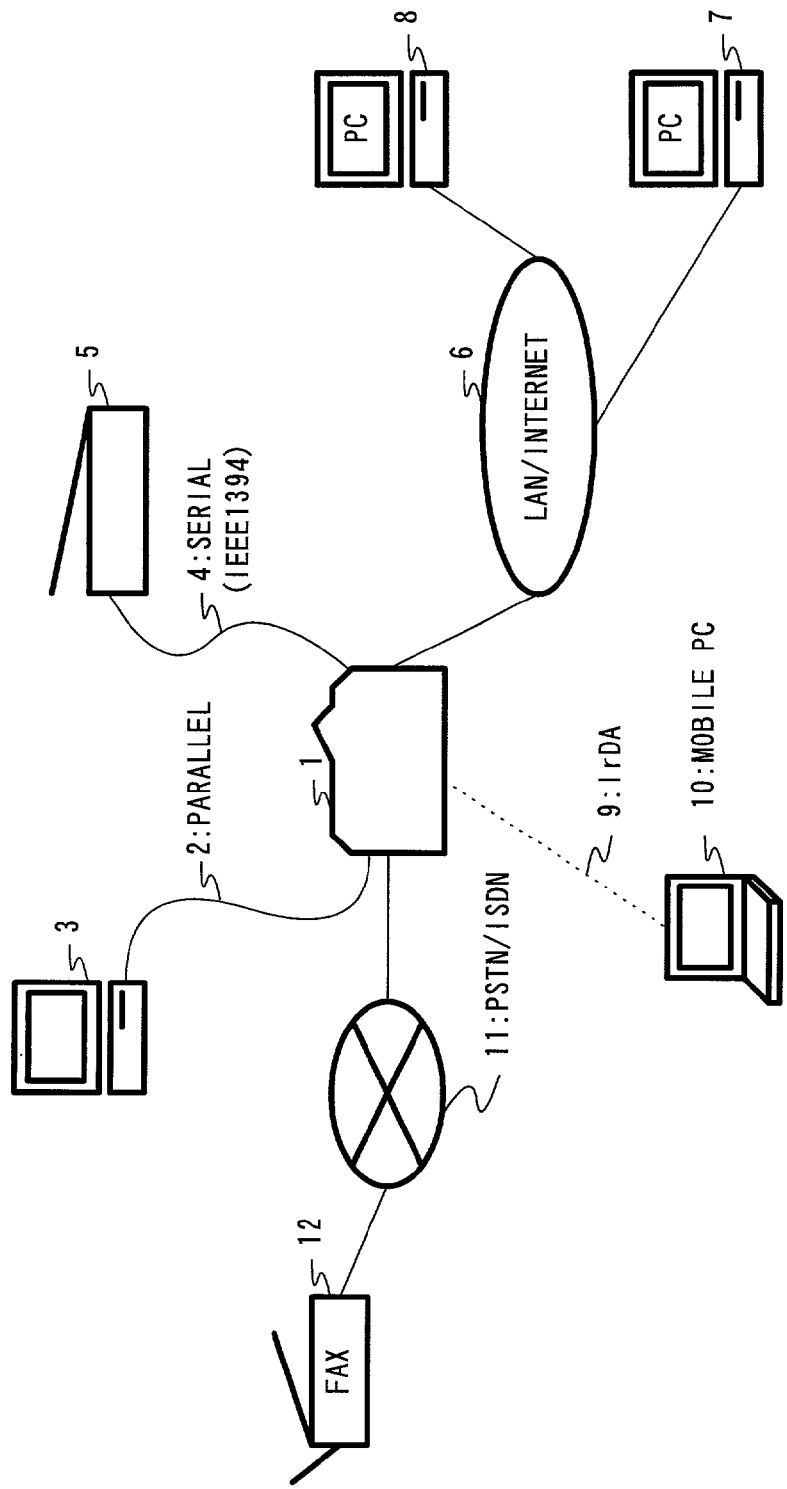
FIG. 1 is an outline view illustrating a network in which a multi-function apparatus as a printing apparatus is operated according to one embodiment of the present invention.

FIG. 1 is an outline view illustrating a network in which a multi-function apparatus 1 is operated as a printing apparatus according to one embodiment of the present invention.

The multi-function apparatus 1 possesses functions as a recording apparatus such as a printer and so forth, a function as a copying apparatus such as a copying instrument and so forth as well as a function as an image communication apparatus such as a facsimile and so forth. FIG. 1 illustrates the multi-function apparatus 1 as an example in which above described functions is used. The multi-function apparatus 1 is connected to a plurality of host apparatuses through a plurality of different transmission lines.

Namely, the multi-function apparatus 1 is connected to a PC 3 through a parallel cable 2. Further the multi-function apparatus 1 is connected to a scanner (separable copier) 5 through a serial cable 4 such as IEEE 1394 and so forth. Furthermore, the multi-function apparatus 1 is connected to PC 7 and PC 8 through a computer network 6 such as the LAN, the internet and so forth. Moreover, the multi-function apparatus 1 is connected to a mobile PC 10 through a radio communication channel such as an infrared communication channel (hereinafter referred to as "IrDA") 9 which is conformed to "IrDA" (InfraRed Data Association). Still moreover, the multi-function apparatus 1 is connected to a FAX 12 through an analog/digital public telephone network (hereinafter referred to as "PSTN/ISDN") 11.

Figure 2:
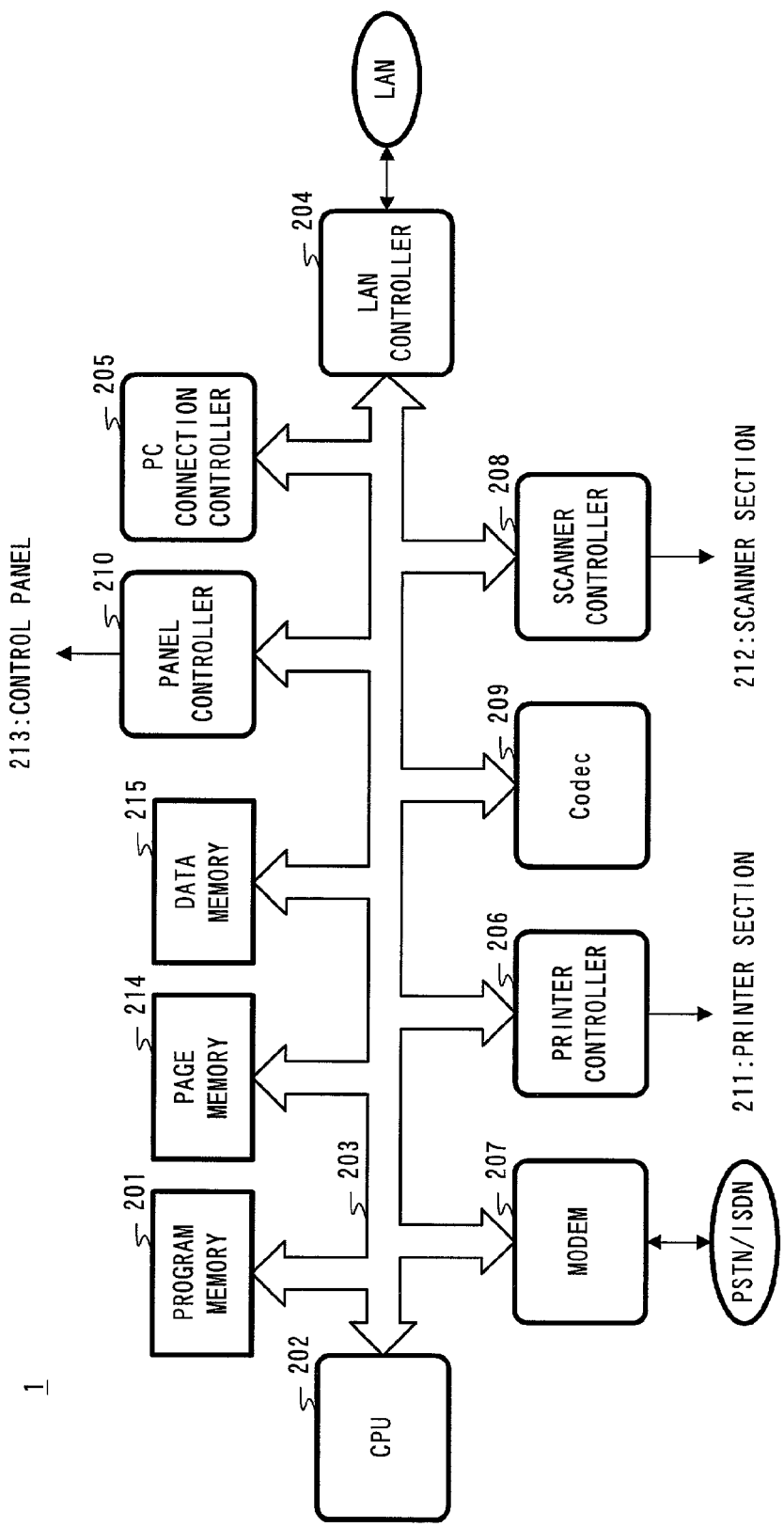
FIG. 2 is an outline block diagram of the multi-function apparatus according to the above-described embodiment.

FIG. 2 is an outline block diagram of the multi-function apparatus 1 according to the present embodiment.

In the present multi-function apparatus 1, a program for implementing functions as the above-described recording apparatus, copying apparatus as well as image communication apparatus is stored in a program memory 201. A CPU 202 implements the functions as the above-described recording apparatus, copying apparatus as well as image communication apparatus while executing these programs.

Further, a program for performing an interpretation (hereinafter this processing is referred to as "interpretive processing") of PDL (Page Description Language) data of printing data transmitted from a host apparatus is stored in the program memory 201. The CPU 202 is capable of performing an interpretation of the PDL data while executing this program. Furthermore, in FIG. 2, the case where the CPU 202 with single configuration is illustrated. However, it is desirable that a plurality of CPU 202 are provided to be performed interpretive processing in order to scheme in high speed of the interpretive processing.

A LAN controller 204, a PC connection controller 205, a printer controller 206, a modem 207, a scanner controller 208, a coder-decoder (hereinafter referred to as "CODEC") 209 and a panel controller 210 are connected to the CPU 202 through a bus 203.

The LAN controller 204 is connected to a LAN or the LAN controller 204 is connected to the computer network 6 such as the internet and so forth through the LAN, followed by controlling transmission-reception of data between the present multi-function apparatus 1 and the computer network 6. According to this processing, the present multi-function apparatus 1 is capable of performing data communication to the PC 7 connected to the LAN, while, the present multi-function apparatus 1 is capable of performing data communication to the PC 8 placed on a remote place and so forth.

The PC connection controller 205 is connected to the PC 3 through the parallel cable 2 to control transmission-reception of data between the PC connection controller 205 and the PC 3. According to this operation, the present multi-function apparatus 1 is capable of performing data communication to the PC 3 connected through the parallel cable 2.

The printer controller 206 is connected to a printer section 211 to control transmission-reception of data between the present multi-function apparatus 1 and the printer section 211. The printer section 211 performs printing of instructed printing data under instruction of the printer controller 206. According to this operation, the present multi-function apparatus 1 is capable of performing printing of the printing data in the printer section 211.

The modem 207 is connected to PSTN/ISDN 11, thus performing data communication as well as facsimile communication through the PSTN/ISDN 11. According to this operation, the present multi-function apparatus 1 is capable of performing facsimile communication to the FAX 12 and so forth placed in a remote place and so forth.

The scanner controller 208 is connected to a scanner section 212 to perform control of the scanner section 212. The scanner section 212 reads image data of a manuscript under control of the scanner controller 208.

The CODEC 209 performs coding or decoding of data scanned by the scanner controller 208 or data received from the modem 207 or so forth.

A control panel 213 is connected to a panel controller 210. An operator of the present multi-function apparatus 1 capable of performing predetermined instruction to the present multi-function apparatus 1 from the control panel 213. The panel controller 210 performs communication of a command and so forth between the panel controller 210 and the control panel 213, before informing the command and so forth to the CPU 202.

Furthermore, the control panel 213 is provided with a touch panel into which an operator inputs the number of sheets for copying, an address of facsimile communication and information of kinds of forms stored in the present multi-function apparatus 1 (hereinafter referred to as "form-type information") and so forth, and a display for indicating status information and so forth of the present multi-function apparatus 1.

Moreover, a page memory 214 and a data memory 215 are connected to the CPU 202 through the bus 203. These page memory 214 and data memory 215 are the common memories for realizing functions as the recording apparatus, the copying apparatus and the image communication apparatus without having special configuration.

The page memory 214 stores therein image data after completion of the interpretive processing of printing data instructed due to the PDL data.

The data memory 215 stores therein image data received through the modem 207, image data of a manuscript being attempted to transmit from the present multi-function apparatus 1, or image data of a manuscript scanned by the scanner section 212 on the occasion of facsimile communication. Further, the data memory 215 stores therein the form-type information inputted from the control panel 213.

Figure 3:
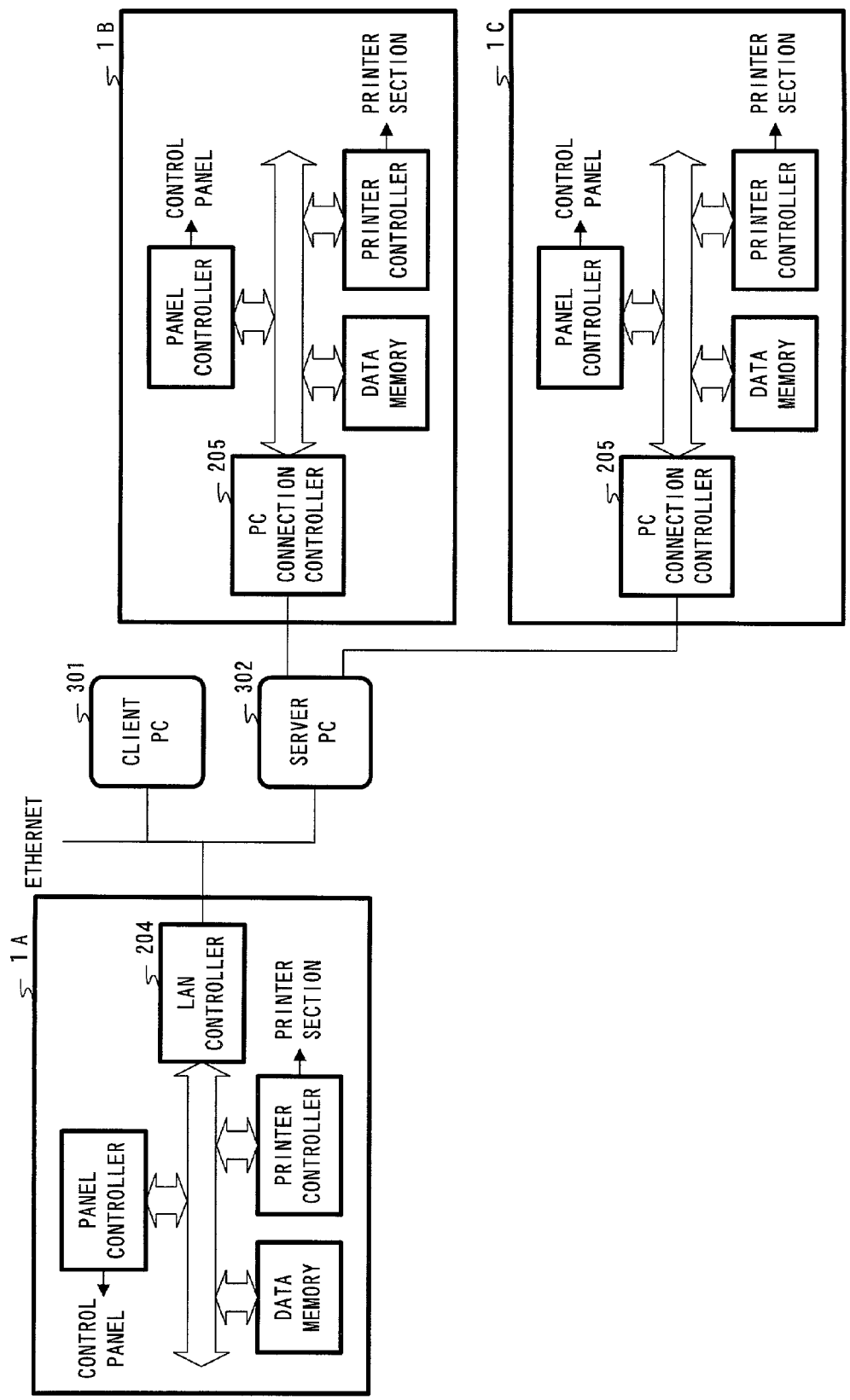
FIG. 3 is a view illustrating a network in which three multi-function apparatus according to the above-described embodiment are connected.

FIG. 3 illustrates a network in which three multi-function apparatus 1A, multi-function apparatus 1B and multi-function apparatus 1C with above-described configuration are connected to the network mutually. As illustrated in FIG. 3, the multi-function apparatus 1A is connected to, for instance, LAN 6 configured in accordance with Ethernet system through a LAN controller 204. Further, a PC (hereinafter referred to as "client PC") 301 as a client is connected to the LAN 6. Furthermore, a PC (hereinafter referred to as "server PC") 302 functioning as a printing server is connected to the LAN 6. Two multi-function apparatus 1B and multi-function apparatus IC are connected to this server PC 302 through the parallel cable 2. The parallel cable 2 is connected to a PC connection controller 205 of the two multi-function apparatus 1B and multi-function apparatus 1C.

The client PC 301 as well as the server PC 302 possesses functions as a common PC. Further, the client PC 301 as well as the server PC 302 possess a setting function of the recording sheet-type information describes later and a function for memorizing the recording sheet-type information set by the recording sheet-type setting function corresponding to selected multi-function apparatus 1 since the client PC 301 and the server PC 302 are employed in the network as illustrated in FIG. 3.

The multi-function apparatus 1 as the printing apparatus according to the present embodiment, in such network, when the client PC 301 requires printing to the special recording sheet, causes the recording sheet-type information to be indicated by the client PC 301, which the recording sheet-type information is set to the multi-function apparatus 1 or the server PC 302 beforehand by the client PC 301. According to this operation, in the client PC 301, there is an effect that the client PC 301 is capable of selecting the multi-function apparatus 1 in which the special recording sheets are stored.

Recording sheet-type information is set beforehand to the present multi-function apparatus 1 or the server PC 302 in order to realize the multi-function apparatus 1 which takes such effect. Firstly, in the present multi-function apparatus 1, processing flow in the case of setting the recording sheet-type information will be described referring to FIG. 4.

In the present multi-function apparatus 1, when the recording sheet-type information is set beforehand, for instance, setting of the recording sheet-type information is instructed from the touch panel of the control panel 213 by a network manager and so forth. When setting of the recording sheet-type information is instructed, the CPU 202 indicates a recording sheet-type setting screen 501 illustrated in FIG. 5 on a display of the control panel 213 (ST 401). For instance, the recording sheet-type setting screen 501 is constituted as a touch panel to a display of the control panel 213.

Figure 5:
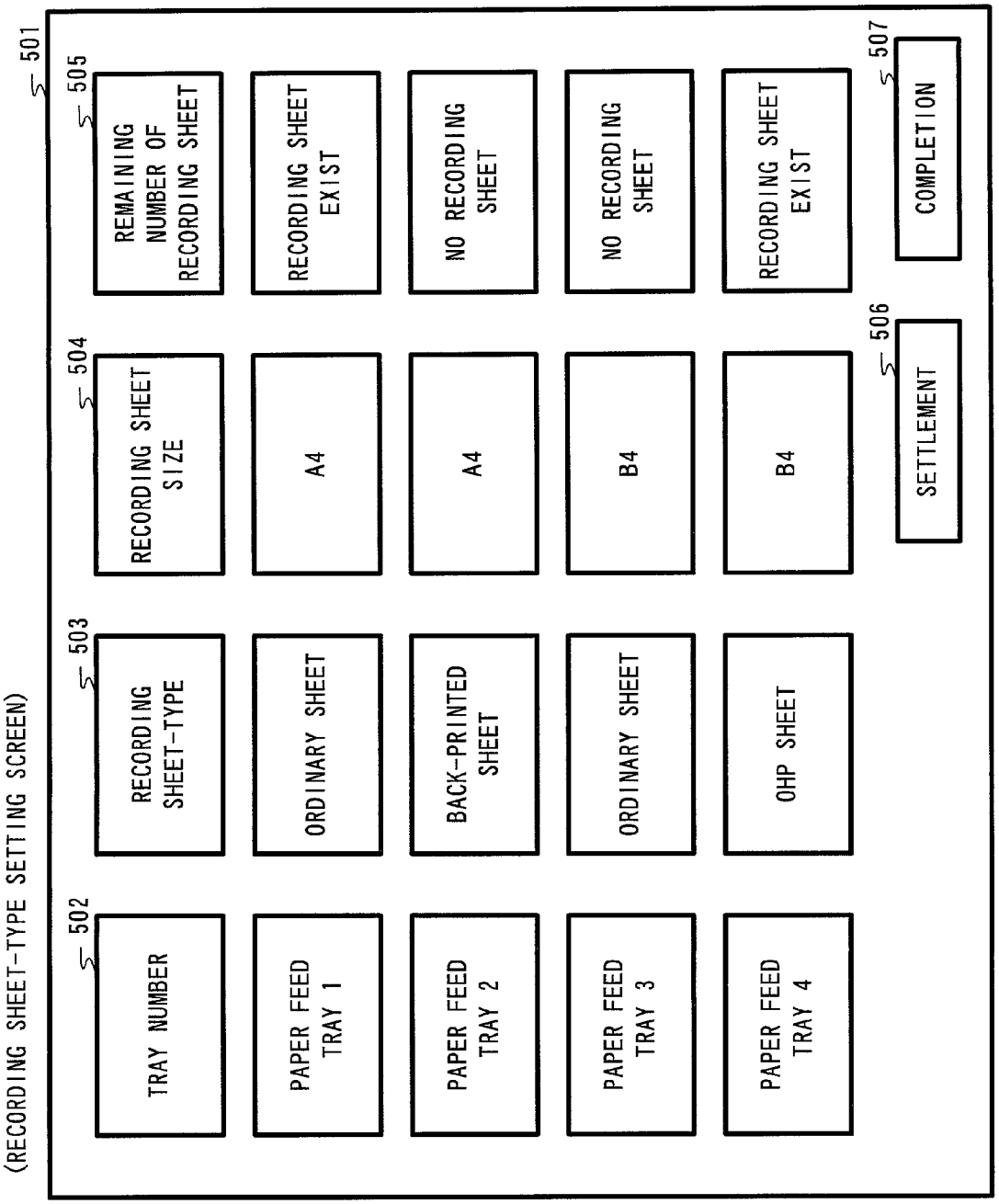
FIG. 5 is a view illustrating a recording sheet-type set screen indicated on a control panel of the multi-function apparatus according to the above described embodiment.

As illustrated in FIG. 5, a tray number key 502, a recording sheet-type key 503, a recording sheet size column 504 and the remaining number of recording sheet column 505 are represented on the recording sheet-type setting screen 501. Further, information of the recording sheet size column 504 and the remaining number of recording sheet column 505 is one capable of being detected by a recording sheet sensor provided on the present multi-function apparatus 1. Consequently, on the occasion of setting of the recording sheet-type information, the network manager and so forth select a paper feed tray by the tray number key 502, and input recording sheet-type by the recording sheet-type key 504. Furthermore, a settlement key 506 indicating settlement of the recording sheet-type information as well as a completion key 507 indicating setting completion of the recording sheet-type information are indicated on the recording sheet-type setting screen 501.

Further, for instance, above-described back printed sheet or OHP sheet is applicable to the recording sheet-type, however, it is suitable to set any recording sheet-type while matching the recording sheet-type with printing processing of the operator without being limited to the back printed sheet or the OHP sheet.

In the recording sheet-type setting screen 501 illustrated in FIG. 5, four paper feed trays (paper feed tray 1 to paper feed tray 4) are indicated. Here, the case where all of four paper feed trays are received in the multi-function apparatus is illustrated. When three paper trays of four paper feed trays are received in the multi-function apparatus, an indication of the paper feed tray key 502 that is not received in the multi-function apparatus becomes dim in comparison with the paper feed tray key 502 that is received in the multi-function apparatus. Further, a recording sheet-type key 503 corresponding to the paper feed tray key 502 also becomes dim, thus an indication of the recording sheet size column 504, and the remaining number of recording sheet column 505 becomes a blank column.

In FIG. 5, a paper feed tray 1 is set such that ordinary sheets of A4-size, which are not performed printing, are stored in the paper feed tray 1. Specifically, at present, the ordinary sheets of A4-size are stored in the paper feed tray 1, thus the remaining number of recording sheet column 505 is "recording sheet existing" state. A paper feed tray 2 is set such that back printed sheets of A4-size are stored therein. Specifically, at present, the back printed sheets of A4-size are not stored in the paper feed tray 2, consequently, the remaining number of recording sheet column is "no recording sheet existing" state. A paper feed tray 3 is set such that ordinary sheets of B4-size are stored in the paper tray 3. Specifically, at present, the ordinary sheets of B4-size are not stored in the paper feed tray 3, thus the remaining number of recording sheet column 505 is "no form existing" state. A form feed tray 4 is set such that OHP sheets of B4-size are stored in the paper feed tray 4. Specifically, at present, the OHP sheets of B4-size are stored in the paper feed tray 4, thus the remaining number of recording sheet column 505 is "recording sheet existing" state.

When this sort of the recording sheet-type setting screen 501 is indicated, since the paper feed tray key 502 to which the recording sheet-type information is to set by the network manager and so forth is selected (ST 402), the CPU 202 judges whether or not a paper feed tray corresponding to selected paper feed tray key 502 is received in the present multi-function apparatus 1 (ST 403). Here, when a paper feed tray corresponding to the selected paper feed tray key 502 is not received in the present multi-function apparatus 1, the CPU 202 indicates that a paper feed tray corresponding to the selected paper feed tray key 502 is not received in the present multi-function apparatus 1, to the display of the control panel 213 (ST 404), thus returning processing to ST 401. Further, in ST 402, when the paper feed tray key 502 is not selected, the CPU 202 waits for selection until the paper feed tray key 502 is selected.

In ST 403, when a paper feed tray corresponding to the selected paper feed tray key 502 is received in the present multi-function apparatus 1, the CPU 202 judges whether or not there is an input of recording sheet-type information from the recording sheet-type setting screen 501 (ST 405). Specifically, the CPU 202 judges whether or not the input of the recording sheet-type information exists in such a way that the CPU 202 judges whether or not a recording sheet-type key 503 corresponding to the selected paper feed tray key 502 is selected. Further, an input of the recording sheet-type information is performed while switching an indication of the recording sheet-type key 503 due to the fact that, for instance, the recording sheet-type key 503 is selected. Specifically, the input of the recording sheet-type information is performed while switching an indication of the recording sheet-type key 503 in the order of the ordinary sheets, the back printed sheets and the OHP sheets.

When an input of the recording sheet-type information exists, the CPU 202 judges whether or not the inputted recording sheet-type information is definite information (ST 406). Specifically, the CPU 202 judges whether or not the inputted recording sheet-type information is definite information in such a way that the CPU 202 judges whether or not the settlement key 506 is selected. Further, in ST 405, when an input of the recording sheet-type information does not exist, or in ST 406, when the settlement key 506 is not selected, the CPU 202 returns processing to ST 405, thus waiting for an input of the recording sheet-type information.

In ST 407, when the CPU 202 judges that the inputted recording sheet-type information is definite information, the CPU 202 judges whether or not another paper feed tray key 502 or completion key 507 is selected (ST 407).

Here, when the another paper feed tray key 502 is selected, the CPU 202 returns processing to ST 403, to perform processing after ST 403 to another paper feed tray again. On the other hand, when the completion key 507 is selected, the CPU 202 ends processing of recording sheet-type setting. When the CPU 202 ends processing of the recording sheet-type setting, the CPU 202 stores the recording sheet-type information set in the multi-function apparatus 1 in accordance with these processing flow into the data memory 215.

Figure 6:
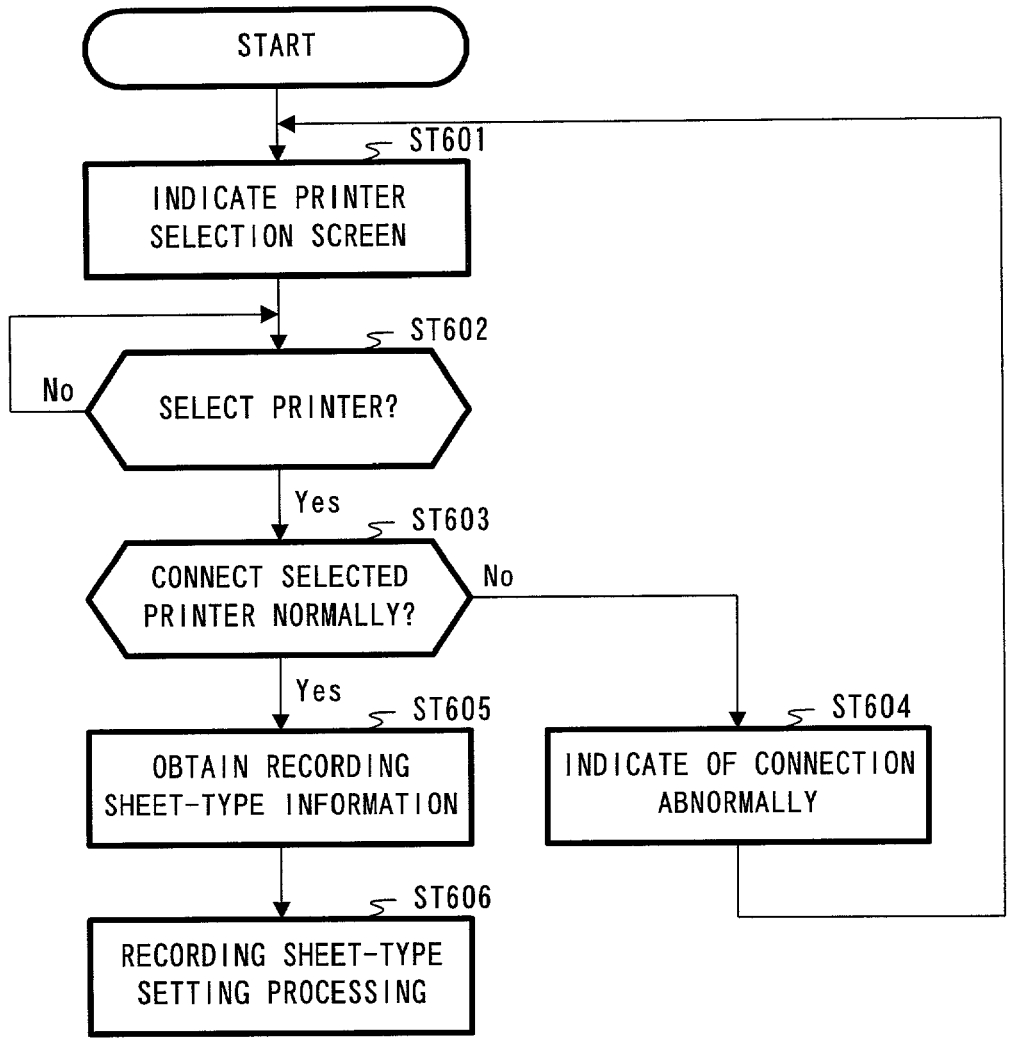
FIG. 6 is a flowchart when a multi-function apparatus to be set is selected on the occasion when a server PC sets recording sheet-type information of a multi-function apparatus according to the above-described embodiment.

Next, in the server PC 302, the case where recording sheet-type information is set beforehand will be described while employing FIG. 6. FIG. 6 is a flowchart of the case where a printer to which the recording sheet-type information is set is selected on occasions when the server PC 302 sets the recording sheet-type information.

In the server PC 302, when the recording sheet-type information is set, for instance, setting of the recording sheet-type information is instructed from a keyboard and so forth by the network manager and so forth. When setting of the recording sheet-type information is instructed, a CPU of the server PC 302 indicates a printer selection screen 701 illustrated in FIG. 7 on a display of the server PC 302 (ST 601).

Figure 7:
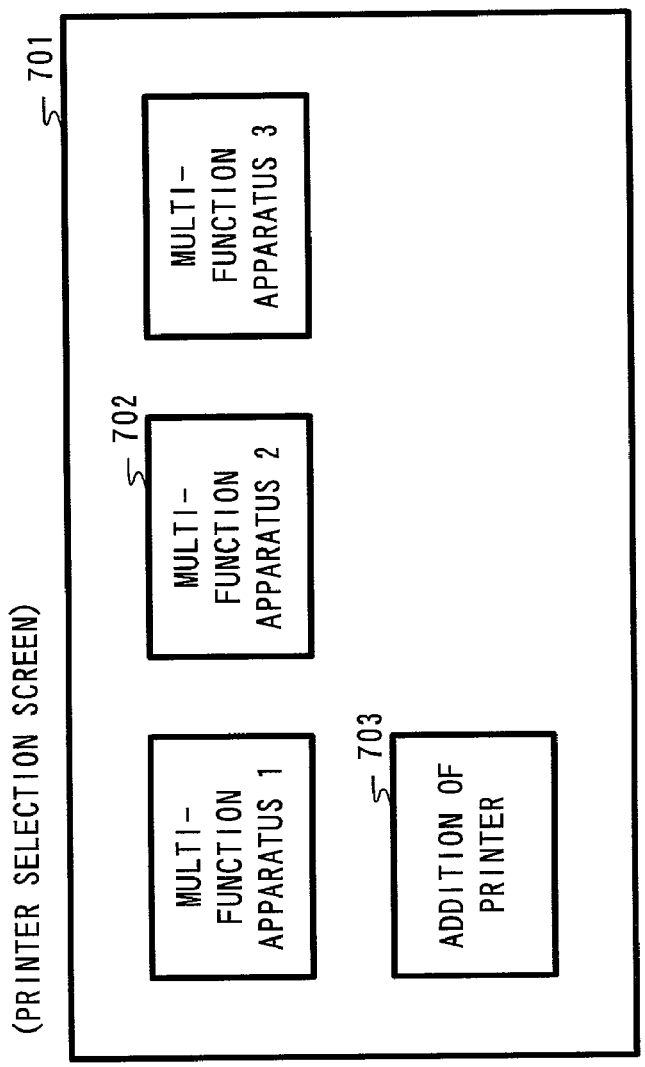
FIG. 7 is a view illustrating a printer selection screen indicated on a display on the occasion when the server PC sets the recording sheet-type information of the multi-function apparatus according to the above-described embodiment.

On the printer selection screen 701, as illustrated in FIG. 7, at present, a printer key 702 indicating three multi-function apparatus connected to the server PC 302 is indicated. Further, on the printer selection screen 701, a printer addition key 703 that is selected when a multi-function apparatus, a printer or so forth is added is indicated.

When such printer selection screen 701 is indicated, since the printer key 702 to which the recording sheet-type information is to be set by the network manager and so forth is selected (ST 602), the CPU of the server PC 302 judges whether or not the multi-function apparatus 1 corresponding to the selected printer key 702 is connected to the server PC 302 normally (ST 603). Here, when the multi-function apparatus 1 corresponding to the selected printer key 702 is not connected to the server PC 302 normally, the CPU of the server PC 302 indicates the effect that the multi-function apparatus 1 corresponding to the selected printer key 702 is not connected to the server PC 302 normally (ST 604), then returning processing to ST 601.

In ST 603, when the multi-function apparatus 1 corresponding to the selected printer key 702 is connected to the server PC 302 normally, the CPU of the server PC 302 obtains the recording sheet-type information from the multi-function apparatus 1 corresponding to the selected printer key 702 (ST 605). When the CPU of the server PC 302 obtains the recording sheet-type information, the CPU of the server PC 302 indicates a recording sheet-type setting screen 501 similar to FIG. 5 on a display of the server PC 302 on the basis of the obtained recording sheet-type information, then, shifting to recording sheet-type setting processing (processing of ST 401 to ST 407 illustrated in FIG. 4) (ST 606).

Figure 4:
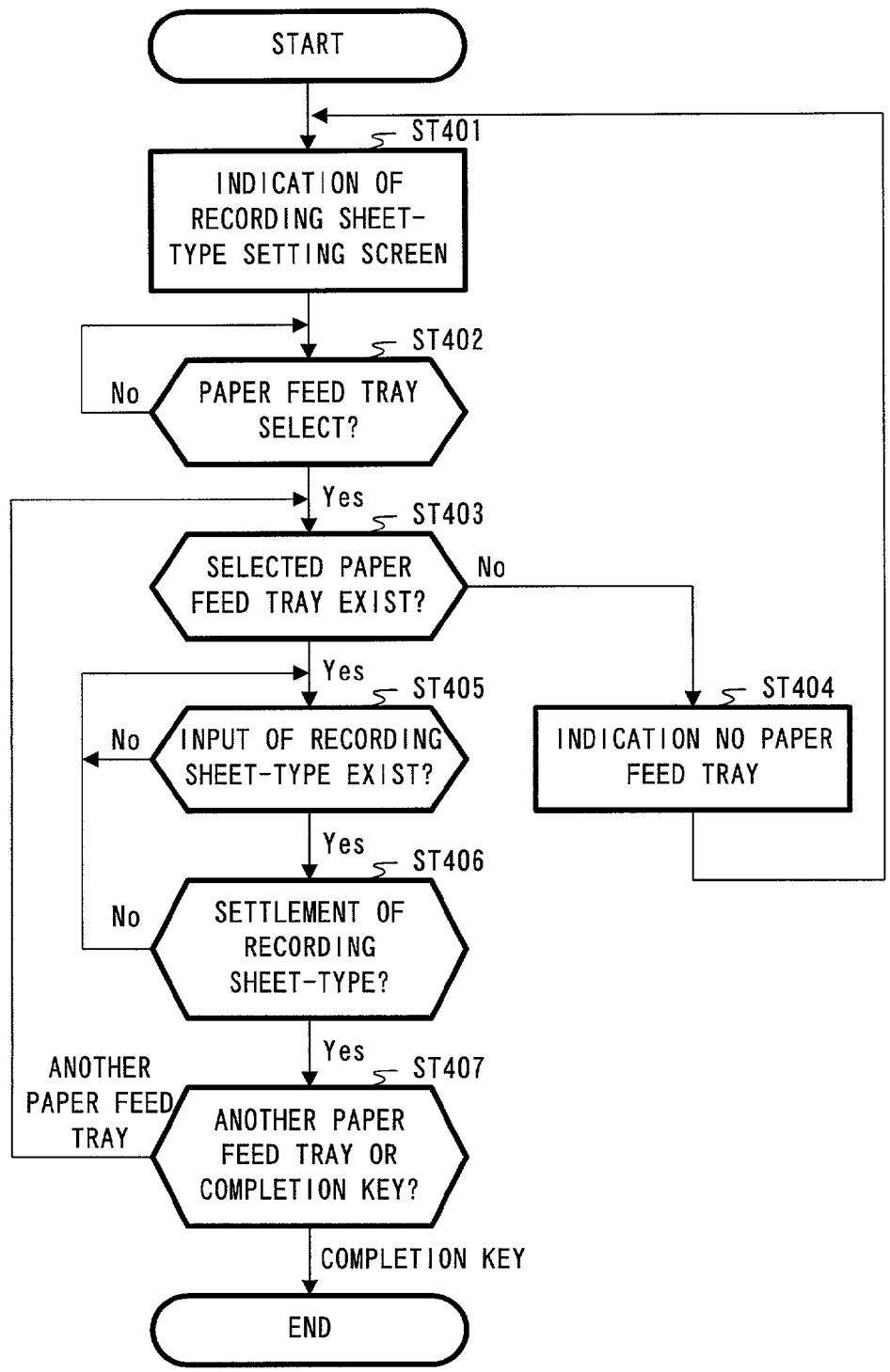
FIG. 4 is a flowchart when recording sheet-type information is set in the multi-function apparatus according to the above-described embodiment.

When processing shifts to the recording sheet-type setting processing, the CPU of the server PC 302 sets the recording sheet-type information to the selected printer in accordance with the processing flow of setting of the recording sheet-type information illustrated in FIG. 4. Then, when the processing of the recording sheet-type information ends, the CPU of the server PC 302 stores the recording sheet-type information set due to the server PC 302 in accordance with these processing flows in a memory of the server PC 302. Further, setting of the recording sheet-type information of this case, for instance, is performed in such a way that, in the display of the server PC 302, key on the recording sheet-type setting screen 501 is selected by a pointing device.

Next, in the network illustrated in FIG. 3, a processing flow in the case where the client PC 301 indicates the recording sheet-type information and selects required recording sheet-type information will be described while employing FIG. 8.

Here, an operator of the client PC 301 desires that the operator prints while employing the back printed sheet of A4-size. The back printed sheets of A4-size are stored in only the multi-function apparatus 1C. Further, the recording sheet-type information is set to the multi-function apparatus 1A from the control panel 213 by the network manager, and the recording sheet-type information is set to the multi-function apparatus 1B and the multi-function apparatus 1C from the server PC 302.

In the client PC 301, when required recording sheet-type information is selected while indicating the recording sheet-type information, an indication of the recording sheet-type information is instructed from a keyboard and so forth by an operator. When an indication of the recording sheet-type information is instructed, a CPU of the client PC 301 indicates the printer selection screen 701 as illustrated in FIG. 7 on the display of the client PC 301 (ST 801).

When such printer selection screen 701 is indicated, a printer key 702 by which the recording sheet-type information is to be indicated is selected by the operator (ST 802), then, the CPU of the client PC 301 judges whether or not the multi-function apparatus 1 corresponding to the selected printer key 702 is connected to the client PC 301 normally (ST 803).

In this case, in ST 802, on the supposition that the printer key 702 corresponding to the multi-function apparatus 1 is selected, and in ST 803, on the supposition that the multi-function apparatus 1 is connected to the client PC 301 normally.

Further, when the multi-function apparatus 1 corresponding to the selected printer key 702 is not connected to the client PC 301 normally, the CPU of the client PC 301 indicates the effect that the multi-function apparatus 1 corresponding to the printer key 702 selected by the display is not connected to the client PC 301 normally (ST 804), then returning processing to ST 801.

Here, since the multi-function apparatus 1A is connected to the client PC 301 normally, the CPU of the client PC 301 inquires the multi-function apparatus 1A about the recording sheet-type information (ST 805). Then the CPU of the client PC 301 judges whether or not setting of the recording sheet-type information exists in the multi-function apparatus 1A (ST 806).

Figure 9:
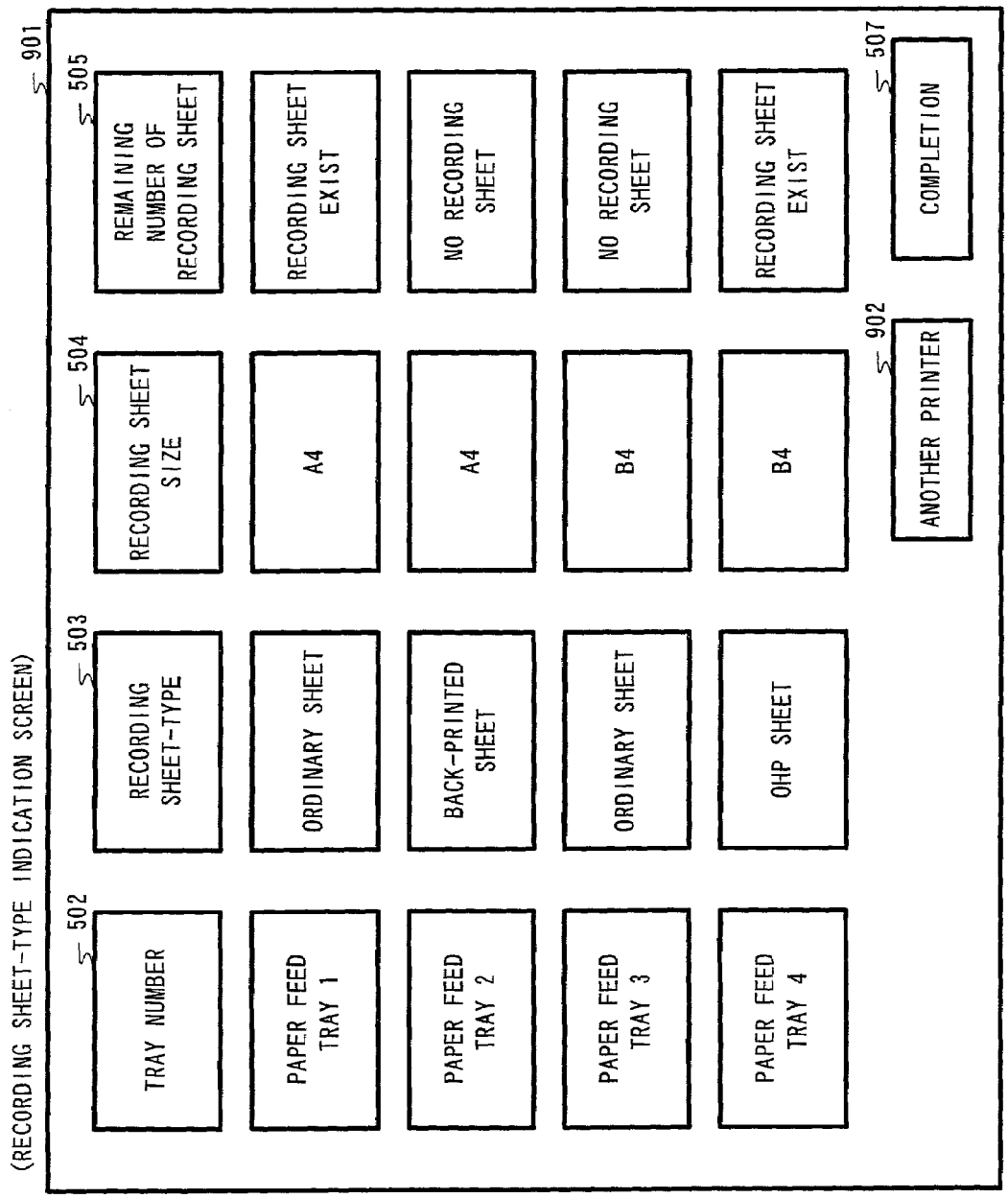
FIG. 9 is a view illustrating a recording sheet-type indicating screen indicated on a display on the occasion when a client PC indicates recording sheet-type information of the multi-function apparatus according to the above-described embodiment.

In this case, since setting of the recording sheet-type information exists in the multi-function apparatus 1A, the CPU of the client PC 301 indicates the recording sheet-type information set to the multi-function apparatus 1A on the display (ST 807). At this time, a recording sheet-type indication screen 901 illustrated in FIG. 9 is indicated on the display of the client PC 301.

Since the recording sheet-type information set to the multi-function apparatus 1A selected in such a way described above is indicated on the display of the client PC 301, the operator of the client PC 301 can ascertain that required kind of recording sheets are stored in the multi-function apparatus 1A.

The recording sheet-type indication screen 901 has roughly the same configuration as the recording sheet-type setting screen 501. However, the recording sheet-type indication screen 901 differs from the recording sheet-type setting screen 501 in respect of the fact that another printer key 902 is indicated instead of the settlement key 506 of the recording sheet-type information. The another printer key 902 is employed in the case where recording sheet-type information set to different printer is indicated when although the recording sheet-type indication screen 901 is indicated, required recording sheet-type is not indicated thereon. Further, the completion key 507 in the recording sheet-type indication screen 901 is employed in the case of completion of an indication of the recording sheet-type information.

When such recording sheet-type indication screen 901 is indicated, the CPU of the client PC 301 judges whether or not an indication of the recording sheet-type information is to be completed (ST 808). Specifically, the CPU of the client PC 301 judges whether any of the completion key 507 from the recording sheet-type indication screen 901 or the another printer key 902 is selected by the operator.

Here, when the completion key 506 is selected, the CPU of the client PC 301 completes an indication of the recording sheet-type information. On the other hand, when the another printer key 902 is selected, the CPU of the client PC 301 returns processing to ST 801. Further, the completion key 506, generally, is selected when the operator can recognize a printer to which required recording sheet-type information is set due to the operator.

In this case, the operator requires printing of the back printed sheet of A4-size. However, the back printed sheet of A4-size is not stored in the multi-function apparatus 1A. For that reason, in ST 808, the operator selects the another printer key 902. Further, in ST 801, the operator selects the printer key 702 corresponding to the multi-function apparatus 1B or the multi-function apparatus 1C from the printer selection screen 701. Here, in ST 802, on the supposition that the printer key 702 corresponding to the multi-function apparatus 1B is selected, and in ST 803, on the supposition that the multi-function apparatus 1B is connected to the client PC 301 normally.

Consequently, the CPU of the client PC 301 inquires about the recording sheet-type information of the multi-function apparatus 1B (ST 805), before judging whether or not setting of the recording sheet-type information exists in the multi-function apparatus 1B (ST 806).

Here, since the recording sheet-type information is not set in the multi-function apparatus 1B from the control panel 213, the CPU of the client PC 301 judges that no recording sheet-type information is set in the multi-function apparatus 1B (ST 806). Namely, in ST 806, the CPU of the client PC 301 judges that setting of the recording sheet-type information exists only when the recording sheet-type information is set from the control panel 213 of the multi-function apparatus 1 selected in ST 802.

When the CPU of the client PC 301 judges that no setting of the recording sheet-type information exists in the multi-function apparatus 1B, the CPU of the client PC 301 inquires about the recording sheet-type information of the multi-function apparatus 1B to the server PC 302 (ST 809). Further, the CPU of the client PC 302 judges whether or not setting of the recording sheet-type information exists on the multi-function apparatus 1B in the server PC 302 (ST 810).

Here, since the recording sheet-type information of the multi-function apparatus 1B is set in the server PC 302, the CPU of the client PC 301 indicates the recording sheet-type information of the multi-function apparatus 1B which is set on the server PC 302 on the display (ST 807).

Thus, even though the recording sheet-type information is not set to the multi-function apparatus 1B, when the recording sheet-type information of the multi-function apparatus 1B is set to the server PC 302, since the recording sheet-type information set to the server PC 302 is indicated on the display of the client PC 301, the operator of the client PC 301 capable of ascertaining whether or not required recording sheet-type is set to the multi-function apparatus 1B.

According to this operation, the recording sheet-type indication screen 901 of the multi-function apparatus 1B is indicated, however, also the back printed sheet of A4-size is not stored in the multi-function apparatus 1B. For that reason, in ST 808, the operator selects the another printer key 902 again. Further, in ST 801, the operator selects the printer key 702 corresponding to the multi-function apparatus 1C from the printer selection screen 701.

Furthermore, the CPU of the client PC 301 performs processing of ST 802 to ST 810 in the same way as the case of the multi-function apparatus 1B. In ST 810, since the recording sheet-type information of the multi-function apparatus 1C is set to the server PC 302, the CPU of the client PC 301 indicates the recording sheet-type information of the multi-function apparatus 1C set to the server PC 302 on the display (ST 807).

According to this operation, the recording sheet-type indication screen 901 of the multi-function apparatus 1C is indicated. The back printed sheet of A4-size is stored in the multi-function apparatus 1C. For that reason, in ST 808, the operator selects the completion key 507. In such operation, the recording sheet-type information required by the operator is indicated on the display of the client PC 301. For that reason, the operator is capable of recognizing the multi-function apparatus 1 in which the back printed sheet of A4-size to be required recording sheet-type is stored. As a result, the operator is capable of selecting the multi-function apparatus 1 in which the back printed sheet of A4-size to be required recording sheet-type is stored.

Now, in ST 810, when the recording sheet-type information of the multi-function apparatus 1 is not set to the server PC 302, the CPU of the client PC 301 judges whether or not the recording sheet-type information of the selected multi-function apparatus 1 exists in the client PC 301 itself (ST 811).

Here, the case where setting of the recording sheet-type information exists in the client PC 301 itself will be described.

The case where setting of the recording sheet-type information exists in the client PC 301 itself is one in which the operator of the client PC 301 sets the recording sheet-type information to the client PC 301 itself as information which the operator manages by employing only the client PC 301. In cases where the operator has instructed an indication of the recording sheet-type information while selecting one a multi-function apparatus 1 before, however, the recording sheet-type information is not set to the multi-function apparatus 1, and also the form-type information is not set to the server PC 302, the operator of the client PC 301 sets the recording sheet-type information to the client PC 301 itself as information which the operator manages by employing only the client PC 301.

In ST 811, when setting of the recording sheet-type information of the selected multi-function apparatus 1 exists in the client PC 301 itself, the CPU of the client PC 301 indicates the recording sheet-type information set to the selected multi-function apparatus 1 on the display (ST 807). On this occasion, the recording sheet-type indication screen 901 illustrated in FIG. 9 is indicated on the display of the client PC 301. In such an operation, the recording sheet-type information set to the client PC 301 itself is indicated on the display of the client PC 301.

Thus, when the recording sheet-type information is not set to the multi-function apparatus itself, also when the recording sheet-type information of the multi-function apparatus is not set to the server apparatus, the CPU of the client PC judges whether or not the recording sheet-type information of the multi-function apparatus is memorized in a memory. According to this operation, when the recording sheet-type information of the multi-function apparatus is memorized in the memory, it is possible to recognize the recording sheet-type stored in the multi-function apparatus.

On the contrary, when the recording sheet-type information of the multi-function apparatus 1 is not set in the client PC 301 itself, the CPU of the client PC 301 judges whether or not the operator sets the recording sheet-type information to the client PC 301 itself (ST 812). Specifically, the CPU of the client PC 301 judges whether or not instruction of the effect that the operator sets the recording sheet-type information to the client PC 301 itself is inputted from the keyboard and so forth.

When instruction of the effect that the operator sets the recording sheet-type information to the client PC 301 itself exists, the CPU of the client PC 301 indicates a recording sheet-type setting screen 501 similar to FIG. 5 on the display of the client PC 301, before shifting to recording sheet-type setting processing (processing of ST 401 to ST 407 illustrated in FIG. 4) (ST 813).

When processing shifts to the recording sheet-type setting processing, the CPU of the client PC 301 sets recording sheet-type information corresponding to selected printer in accordance with a processing flow of setting of the recording sheet-type information illustrated in FIG. 4. Further, when processing of recording sheet-type setting is terminated, the CPU of the client PC 301 stores the set recording sheet-type information in a memory of the client PC 301. In such operation, the recording sheet-type information of the selected multi-function apparatus 1 is set to the client PC 301 itself.

Further, in the present embodiment, when the recording sheet-type information of the selected multi-function apparatus 1 is not set to the client PC 301 itself, processing shifts to processing for judging whether or not the CPU of the client PC sets the recording sheet-type information of the multi-function apparatus. However, when the recording sheet-type information is not set, it is also suitable that the effect is indicated on the display of the client PC 301. In this case, it is possible to encourage the operator of the client PC 301 concerning the following processing.

Concerning such recording sheet-type information set to the client PC 301 itself, when the recording sheet-type information is set to the multi-function apparatus 1 or the server PC 302, naturally, reliability of such recording sheet-type information is high. However, since such recording sheet-type information set to the client PC 301 itself is available recording sheet-type information until the recording sheet-type information is set to the multi-function apparatus 1 or the server PC 302, the operator of the client PC 301 capable of ascertaining the recording sheet-type information of the multi-function apparatus 1 by the client PC 301 itself until the point time the recording sheet-type information is set.

In the meantime, when instruction of the effect that the operator sets the recording sheet-type information to the client PC 301 itself does not exist, the CPU of the client PC 301 indicates the effect that the recording sheet-type information can not be indicated on the display (ST 814), then ending an indication of the form-type information.

In such operation, according to the multi-function apparatus 1 of the present embodiment, the recording sheet-type information stored in the multi-function apparatus 1 is set to the multi-function apparatus 1, the server PC 302 or the client PC 301, which are connected to a network beforehand. For that reason, when the client PC 301 performs printing, it is possible to indicate the recording sheet-type information set to the multi-function apparatus 1 in such a way that the client PC 301 inquires about the recording sheet-type information. For that reason, the operator of the client PC 301 is capable of selecting the multi-function apparatus 1 in which required special sheets is stored surely by ascertaining the recording sheet-type information. As a result, it is possible to perform printing with required special sheets.

Figure 8:
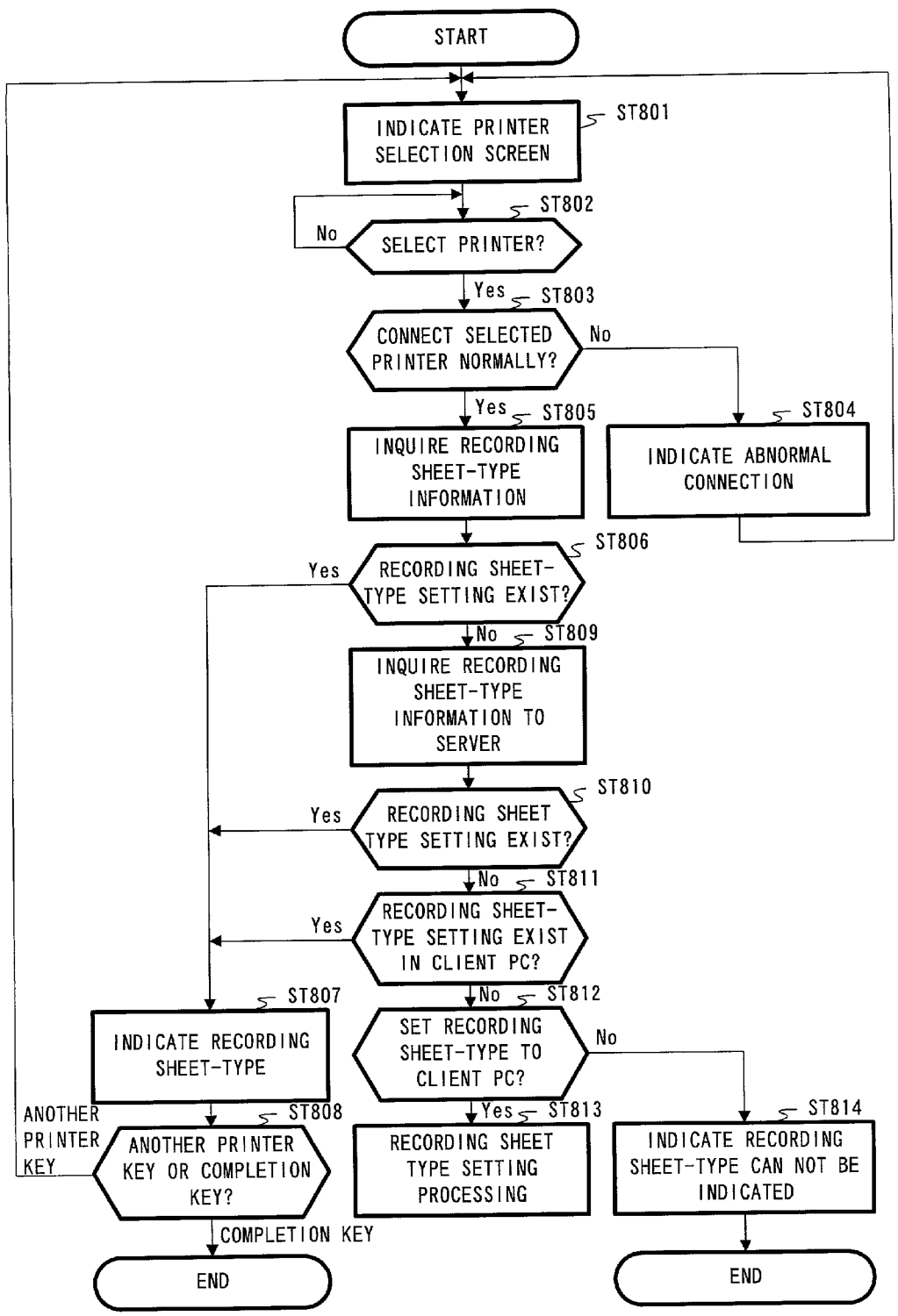
FIG. 8 is a flowchart when a client PC selects required recording sheet-type information while indicating a recording sheet-type contained in a multi-function apparatus according to the above-described embodiment.

Further, in the multi-function apparatus 1 of the present embodiment, as illustrated in FIG. 8, when the client PC 301 performs printing, firstly, a multi-function apparatus 1 on which printing is desired is selected (ST 802). Then the client PC 301 judges existence of required recording sheet-type while indicating the recording sheet-type information set to the selected a multi-function apparatus 1 (ST 808).

Furthermore, in the multi-function apparatus 1 of the present embodiment, as illustrated in FIG. 8, when the client PC 301 performs printing, firstly, the multi-function apparatus 1 by which printing is desired is selected (ST 802). Moreover, when the set recording sheet-type information does not exist in the selected multi-function apparatus 1, the client PC 301 judges whether or not the recording sheet-type information set to the selected a multi-function apparatus is set (ST 809).

However, the present multi-function apparatus 1 is not limited from such embodiment. Namely, it is also suitable that when the client PC 301 performs printing, firstly, the client PC 301 obtains the set recording sheet-type information collectively from the server PC 302, thus indicating the obtained recording sheet-type information collectively on the display, before selecting the multi-function apparatus 1 in which required recording sheet-type is stored. In the case of such variation, it is not necessary to judge existence of required recording sheet-type while selecting the multi-function apparatus 1 connected to the network successively. Consequently, when the recording sheet-type information of the whole multi-function apparatus 1 connected to the network is set to the server PC 302 beforehand, it is possible to realize the multi-function apparatus 1 which is more excellent in respect of convenience.

As described-above, according to the present invention, when the recording sheet-type information is set to the printing apparatus and so forth connected to the network beforehand, it is possible to indicate the recording sheet-type information set to the printing apparatus in the case where the client PC performs printing. According to such operation, it is possible to select printing apparatus in which required special sheets is stored surely. Thus it is possible to provide the printing apparatus, the server apparatus as well as the information processing apparatus, which are more excellent in respect of convenience.

The present invention is not limited to the above described embodiments, and various variations and modifications may be possible without departing from the scope of the present invention.

This application is based on the Japanese Patent Application No.2000-058779 filed on Mar. 3, 2000, entire content of which is expressly incorporated by reference herein.

What is claimed is:
1. A printing apparatus comprising:
a LAN controller configured to connect to a terminal apparatus, to enable communication between the printing apparatus and the terminal apparatus;
a sensor configured to detect a size of a recording sheet set in the printing apparatus;

a panel configured to input a type of the recording sheet set in the printing apparatus, the type of the recording sheet not being detectable by the sensor;

a memory configured to store the type of the recording sheet input by the panel;

a controller configured to transmit, to the terminal apparatus, predetermined information regarding the recording sheet set in the printing apparatus, the predetermined information including the size of the recording sheet detected by the sensor and the type of the recording sheet input by the panel.

2. The printing apparatus according to claim 1, wherein the controller transmits, to the terminal apparatus, the predetermined information regarding the recording sheet set in the printing apparatus, when the terminal apparatus requests, from the printing apparatus, the predetermined information regarding the recording sheet set in the printing apparatus.

3. The printing apparatus according to claim 2, wherein the type of the recording sheet comprises at least one of a recording sheet with one side that has already been printed and an OHP sheet.

4. The printing apparatus according to claim 1, wherein the terminal apparatus comprises a server apparatus and an information processing apparatus, the server apparatus comprising:

a input device configured to input a type of the recording sheet set in the printing apparatus, the type of the recording sheet not being detectable by the sensor of the printing apparatus;

a server memory configured to store the type of the recording sheet input by the input device;

a server controller configured to transmit, to the information processing apparatus, the predetermined information regarding the type of recording sheet set in the printing apparatus.

5. The printing apparatus according to claim 4, wherein the sever controller transmits, to the information processing apparatus, the predetermined information regarding the type of the recording sheet set in the printing apparatus, when the information processing apparatus requests, from the server apparatus, the predetermined information regarding the type of the recording sheet set in the printing apparatus.

6. The printing apparatus according to claim 5, wherein the type of the recording sheet comprises at least one of a recording sheet with one side that has already been printed and an OHP sheet.

7. The printing apparatus according to claim 4, the information processing apparatus comprising:

a display configured to display data; and a processing controller configured to request, from the printing apparatus, the type of the recording sheet set in the printing apparatus, the type of the recording sheet not being detectable by the sensor of the printing apparatus, to obtain, from the printing apparatus, the predetermined information regarding the type of the recording sheet set in the printing apparatus, and to display the obtained predetermined information on the display.

8. The printing apparatus according to claim 7, wherein when the printing apparatus does not have the predetermined information regarding the type of the recording sheet set in the printing apparatus, the processing controller requests, from the server apparatus, the type of the recording sheet set in the printing apparatus, obtains, from the server apparatus, the predetermined information regarding the type of the recording sheet set in the printing apparatus, and displays the obtained information on the display.

9. The printing apparatus according to claim 8, wherein the information processing apparatus further comprises a processing memory configured to store the predetermined information regarding the type of the recording sheet set in the printing apparatus, wherein, when the server apparatus does not have the predetermined information, the processing controller obtains, from the processing memory, the predetermined information regarding the type of the recording sheet set in the printing apparatus, and displays the obtained predetermined information on the display.

10. The printing apparatus according to claim 9, wherein the processing controller displays on the display a message indicating that the predetermined information regarding the type of the recording sheet set in the printing apparatus is not stored in the processing memory, when the predetermined information is not stored in the memory.

11. The printing apparatus according to claim 10, wherein the information processing apparatus further comprises a processing input device configured to input, to the processing memory, the predetermined information regarding the type of the recording sheet set in the printing apparatus.

12. The printing apparatus according to claim 4, the information processing apparatus comprising:

a display configured to display data; and a processing controller configured to request, from the server apparatus, the type of the recording sheet set in the printing apparatus, the type of the recording sheet not being detectable by the sensor of the printing apparatus, to obtain, from the server apparatus, the predetermined information regarding the type of the recording sheet set in the printing apparatus, and to display the obtained predetermined information on the display.

13. A method of printing utilizing a printing apparatus connected to a terminal apparatus for communication between the printing apparatus and the terminal apparatus, the method comprising:

detecting a size of a recording sheet set in the printing apparatus;

inputting a type of recording sheet set in the printing apparatus, the type of the recording sheet not being detectable;

storing the input type of recording sheet;

transmitting, to the terminal apparatus, predetermined information regarding the recording sheet set in the printing apparatus, the predetermined information including the detected size of the recording sheet and the input type of the recording sheet.

14. The printing method according to claim 13, further comprising transmitting to the terminal apparatus, the predetermined information regarding the recording sheet set in the printing apparatus, when the terminal apparatus requests the predetermined information regarding the recording sheet set in the printing apparatus from the printing apparatus.

15. The method according to claim 13, wherein the type of recording sheet comprises of at least one of a recording sheet with one side that has been printed in an OHP sheet.

* * * * *